United States Patent
Zhang et al.

(10) Patent No.: US 11,105,955 B2
(45) Date of Patent: Aug. 31, 2021

(54) METHOD AND SYSTEM FOR PROCESSING GRAVITY AND MAGNETIC DATA IN GEOLOGICAL RESOURCE EXPLORATION

(71) Applicant: Chinese Academy of Geological Sciences, Beijing (CN)

(72) Inventors: Chong Zhang, Beijing (CN); Qingtian Lyu, Beijing (CN)

(73) Assignee: Chinese Academy of Geological Sciences, Beijing (CN)

( * ) Notice: Subject to any disclaimer, the term of this patent is extended or adjusted under 35 U.S.C. 154(b) by 149 days.

(21) Appl. No.: 16/532,773

(22) Filed: Aug. 6, 2019

(65) Prior Publication Data
US 2020/0379141 A1    Dec. 3, 2020

(30) Foreign Application Priority Data

May 30, 2019   (CN) .......................... 201910461802.5

(51) Int. Cl.
| | |
|---|---|
| *G01V 11/00* | (2006.01) |
| *G01V 3/08* | (2006.01) |
| *G01V 7/06* | (2006.01) |
| *G01V 3/38* | (2006.01) |

(52) U.S. Cl.
CPC ............ *G01V 11/002* (2013.01); *G01V 3/087* (2013.01); *G01V 3/38* (2013.01); *G01V 7/06* (2013.01)

(58) Field of Classification Search
USPC ........................................................... 702/2
See application file for complete search history.

(56) References Cited

U.S. PATENT DOCUMENTS

| | | | | |
|---|---|---|---|---|
| 6,993,433 B2 * | 1/2006 | Chavarria | ................ | G01V 1/28 |
| | | | | 702/14 |
| 2004/0260471 A1 * | 12/2004 | McDermott | ............. | G01V 3/38 |
| | | | | 702/2 |
| 2014/0129194 A1 * | 5/2014 | Zhdanov | .............. | G01V 99/005 |
| | | | | 703/2 |

* cited by examiner

*Primary Examiner* — Paul D Lee
(74) *Attorney, Agent, or Firm* — Troutman Pepper Hamilton Sanders LLP; Christopher C. Close, Jr.

(57) ABSTRACT

The present invention discloses a method and system for processing gravity and magnetic data in geological resource exploration. The method includes: acquiring first (i) potential field data and (ii) gradient data of an observation surface, performing upward continuation of the acquired data using a wave-number domain conversion method to obtain second and third gradient data and second potential field data, and determining third potential field data using a fourth-order explicit scheme Milne method according to the first, second, and third gradient data, and the second potential field data; calculating fourth gradient data using an ISVD method according to the third potential field data; and correcting the third potential field data using a fourth-order implicit scheme Simpson method according to the fourth gradient data, the first potential field data, and the first and second gradient data to obtain corrected third potential field data.

8 Claims, 2 Drawing Sheets

METHOD AND SYSTEM FOR PROCESSING GRAVITY AND MAGNETIC DATA IN GEOLOGICAL RESOURCE EXPLORATION

CROSS-REFERENCE TO RELATED APPLICATION

This application claims benefit of Chinese Application number 201910461802.5 filed May 30, 2019, entitled "METHOD AND SYSTEM FOR PROCESSING GRAVITY AND MAGNETIC DATA IN GEOLOGICAL RESOURCE EXPLORATION."

TECHNICAL FIELD

The present invention relates to the technical field of geological resource exploration, and in particular to a method and system for processing gravity and magnetic data in geological resource exploration.

BACKGROUND

Against practical problems concerned with exploration of geological mineral resources and the like, in order to improve the accuracy and reliability of an interpretation result, downward continuation of a potential field is performed, and the downward continuation of the potential field can highlight local and shallow geological information, which plays a very important role in potential field data processing and interpretation and aided navigation. However, the downward continuation of the potential field is an ill-posed issue and has been a research hotspot for potential field exploration.

Existing processing methods for downward continuation of a potential field mainly include: a downward continuation spatial domain interpolation method, of which, however, the calculation is complicated and the precision is not high; a conventional downward continuation FFT method, according to which not only do downward continuation factors have high frequency amplification effects, but also discretization and truncation errors of the Fourier transform cause high-frequency oscillations in continuation results; improved methods based on conventional downward continuation FFT methods, such as a regularization method, a generalized inverse method, a matched filtering method, and a Wiener filtering method, according to which although the stability of downward continuation is improved, a downward continuation depth is not large (generally no more than 5 times the dot interval); a downward continuation integral iteration method, according to which the stable downward continuation of noiseless data can be achieved and the downward continuation dot interval is large, but the number of iterations is large, resulting in the decrease of computational efficiency; and a downward continuation Adams-Bashforth method and a downward continuation Milne method, according to which a corresponding downward continuation formula is established through a numerical solution of a differential equation by using a measured vertical derivative, but the accuracy thereof is not high.

SUMMARY

Based on this, an objective of the present invention is to provide a method and system for processing gravity and magnetic data in geological resource exploration, so as to improve the accuracy of a downward continuation result, which has practical significance for improving the accuracy of the potential field exploration interpretation.

To achieve the above purpose, the present invention provides the following technical solution.

A method for processing gravity and magnetic data in geological resource exploration includes:

acquiring first potential field data and first gradient data of an observation surface, where the observation surface is a horizontal plane of a survey location, the first potential field data is gravity field data or magnetic field data at a height of the observation surface, and the first gradient data is a first vertical derivative of the first potential field data;

performing upward continuation of the first potential field data and the first gradient data by using a wave-number domain conversion method, to obtain second gradient data after upward continuation by a height of h, third gradient data after upward continuation by a height of 2h, and second potential field data after upward continuation by a height of 3h, where h represents a distance between the observation surface and a continuation surface, h>0;

determining third potential field data after downward continuation by a height of h by using a fourth-order explicit scheme Milne method according to the first gradient data, the second gradient data, the third gradient data, and the second potential field data;

calculating fourth gradient data after downward continuation by a height of h by using an ISVD method according to the third potential field data; and correcting the third potential field data by using a fourth-order explicit scheme Milne method according to the fourth gradient data, the first potential field data, the first gradient data, and the second gradient data, to obtain corrected third potential field data.

Optionally, the determining third potential field data after downward continuation by a height of h by using a fourth-order explicit scheme Milne method according to the first gradient data, the second gradient data, the third gradient data, and the second potential field data specifically includes:

determining the third potential field data according to a formula $$\tilde{u}(x, y, z_0 - h) = u(x, y, z_0 + 3h) + \frac{4h}{3}[2u_z(x, y, z_0 + 2h) - u_z(x, y, z_0 + h) + 2u_z(x, y, z_0)];$$

where $u(x, y, z_0+3h)$ represents second potential field data, $u_z(x, y, z_0+h)$ represents second gradient data, $u_z(x, y, z_0+2h)$ represents third gradient data, $u_z(x, y, z_0)$ represents first gradient data, $z_0$ represents a height of an observation surface, and x,y represents spatial domain coordinates.

Optionally, the calculating fourth gradient data after downward continuation by a height of h by using an ISVD method according to the third potential field data specifically includes:

determining a scalar potential of the third potential field data by using a wave-number domain conversion method according to the third potential field data;

determining a second derivative of the scalar potential in the horizontal direction by using a finite difference method according to the scalar potential; and determining the fourth gradient data by using a Laplace method according to the second derivative of the scalar potential in the horizontal direction.

Optionally, the correcting the third potential field data by using a fourth-order explicit scheme Milne method according to the fourth gradient data, the first potential field data, the first gradient data, and the second gradient data, to obtain corrected third potential field data specifically includes:

determining the corrected third potential field data according to a formula $$u(x, y, z_0 - h) =$$
$$u(x, y, z_0) + \frac{h}{3}[u_z(x, y, z_0 + h) + 4u_z(x, y, z_0) + \tilde{u}_z(x, y, z_0 - h)];$$

where $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

A system for processing gravity and magnetic data in geological resource exploration includes:

a first potential field data and first gradient data acquiring module, configured to acquire first potential field data and first gradient data of an observation surface, where the observation surface is a horizontal plane of a survey location, the first potential field data is gravity field data or magnetic field data at a height of the observation surface, and the first gradient data is a first vertical derivative of the first potential field data;

a second gradient data, third gradient data and second potential field data acquiring module, configured to perform upward continuation of the first potential field data and the first gradient data by using a wave-number domain conversion method, to obtain second gradient data after upward continuation by a height of h, third gradient data after upward continuation by a height of 2h, and second potential field data after upward continuation by a height of 3h, where h represents a distance between the observation surface and a continuation surface, h>0;

a third potential field data determining module, configured to determine third potential field data after downward continuation by a height of h by using a fourth-order explicit scheme Milne method according to the first gradient data, the second gradient data, the third gradient data, and the second potential field data;

a fourth potential field data determining module, configured to calculate fourth gradient data after downward continuation by a height of h by using an ISVD method according to the third potential field data; and a module for determining corrected third potential field data, configured to correct the third potential field data by using a fourth-order explicit scheme Milne method according to the fourth gradient data, the first potential field data, the first gradient data, and the second gradient data, to obtain corrected third potential field data.

Optionally, the third potential field data determining module specifically includes:

a third potential field data determining unit, configured to determine the third potential field data according to a formula $$\tilde{u}(x, y, z_0 - h) =$$
$$u(x, y, z_0 + 3h) + \frac{4h}{3}[2u_z(x, y, z_0 + 2h) - u_z(x, y, z_0 + h) + 2u_z(x, y, z_0)];$$

where $u(x, y, z_0+3h)$ represents second potential field data, $u_z(x, y, z_0+h)$ represents second gradient data, $u_z(x, y, z_0+2h)$ represents third gradient data, $u_z(x, y, z_0)$ represents first gradient data, $z_0$ represents a height of an observation surface, and x,y represents spatial domain coordinates.

Optionally, the fourth gradient data determining module specifically includes:

a scalar potential determining unit, configured to determine a scalar potential of the third potential field data by using a wave-number domain conversion method according to the third potential field data;

a unit for determining a second derivative of a scalar potential in the horizontal direction, configured to determine a second derivative of the scalar potential in the horizontal direction by using a finite difference method according to the scalar potential; and a fourth gradient data determining unit, configured to determine the fourth gradient data by using a Laplace method according to the second derivative of the scalar potential in the horizontal direction.

Optionally, the module for determining corrected third potential field data specifically includes:

a unit for determining corrected third potential field data, configured to determine the corrected third potential field data according to a formula $$u(x, y, z_0 - h) =$$
$$u(x, y, z_0) + \frac{h}{3}[u_z(x, y, z_0 + h) + 4u_z(x, y, z_0) + \tilde{u}_z(x, y, z_0 - h)],$$

where $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

According to specific embodiments provided in the present invention, the present invention discloses the following technical effects:

According to the method and system for processing gravity and magnetic data in geological resource exploration provided by the present invention, upward continuation of first potential field data and first gradient data is performed by using a wave-number domain conversion method, and then third potential field data is determined by using a fourth-order explicit scheme Milne method according to second potential field data, second gradient data and third gradient data after upward continuation; fourth gradient data is calculated by using an ISVD method according to the third potential field data; the third potential field data is corrected by using a fourth-order implicit scheme Simpson method according to the fourth gradient data, the first potential field data, the first gradient data and the second gradient data, to obtain corrected third potential field data; the corrected third potential field data is to-be-acquired potential field data after downward continuation by a height of h, and the potential field data has higher accuracy after being processed by using the above method, which has practical significance for precision improvement of potential field exploration interpretation.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a method and system for processing gravity and magnetic data in geological resource exploration, so as to improve the accuracy of a downward continuation result, which has practical significance for improving the accuracy of the potential field exploration interpretation.

To make the foregoing objective, features, and advantages of the present invention clearer and more comprehensible, the present invention is further described in detail below with reference to the accompanying drawings and specific embodiments.

At present, a truncation error of a downward continuation Milne method is $14/45 sh^5 u_z^{(5)}(x,y,\omega)$, and a truncation error of an implicit scheme Simpson method is $-1/90 h^5 u_z^{(5)}(x,y,\omega)$, which is significantly smaller than that of an existing downward continuation Milne method, so the Simpson method has higher calculation accuracy and makes a numerical calculation result more accurate, but the Simpson method belongs to an implicit scheme and cannot be directly applied to the downward continuation calculation. Therefore, the present invention combines the explicit scheme Milne method and the implicit scheme Simpson method to form a Milne-Simpson predictive correction method for processing gravity and magnetic data. The downward continuation is achieved, and the accuracy of a downward continuation result is improved.

Figure 1:
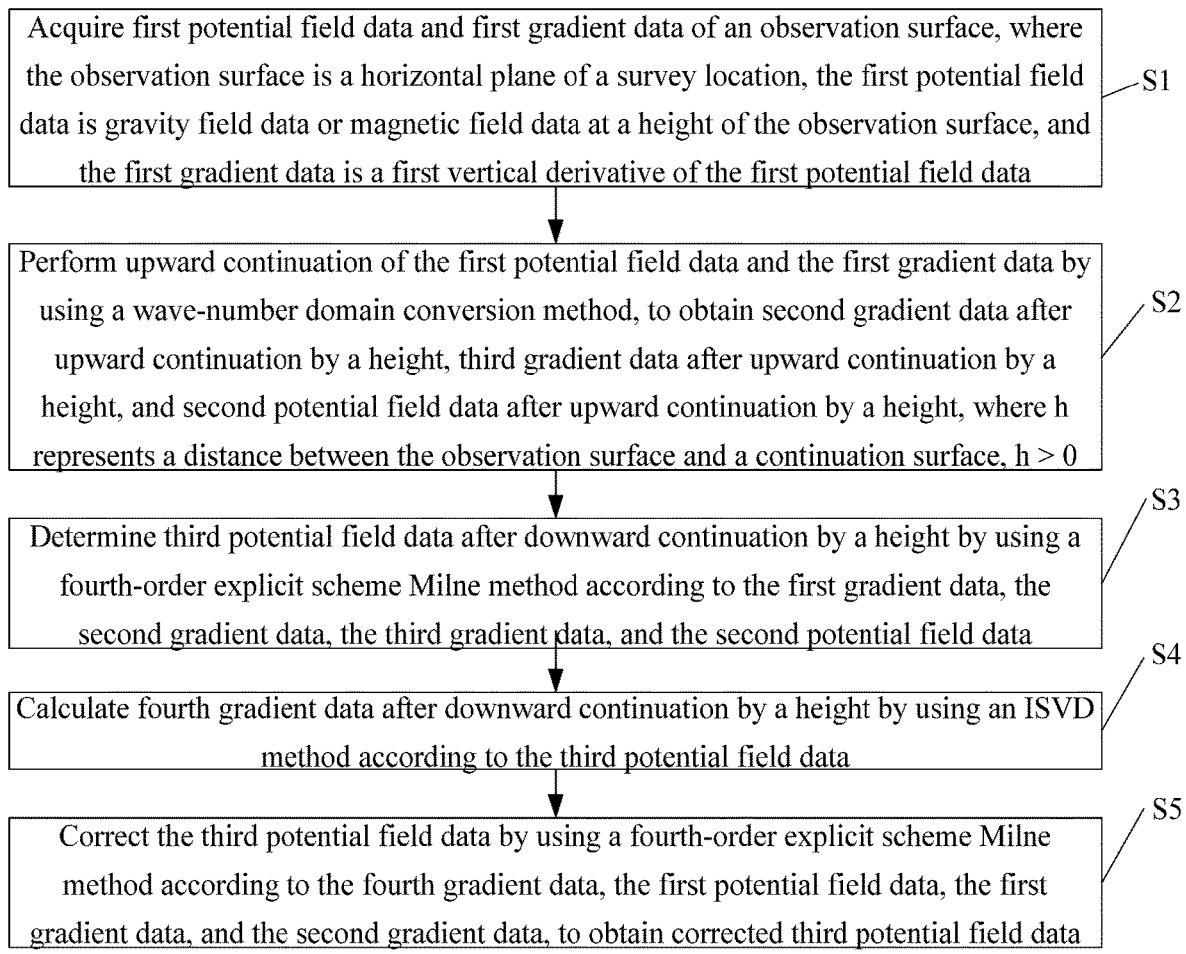
FIG. 1 is a flow chart of a method for processing gravity and magnetic data in geological resource exploration according to an embodiment of the present invention.

FIG. 1 is a flow chart of a method for processing gravity and magnetic data in geological resource exploration according to an embodiment of the present invention. Referring to FIG. 1, the method for processing gravity and magnetic data in geological resource exploration includes:

Step S1: acquire first potential field data $u(x, y, z_0)$ and first gradient data $u_z(x, y, z_0)$ of an observation surface, where the observation surface is a horizontal plane of a survey location, the first potential field data is gravity field data or magnetic field data at a height $z_0$ of the observation surface, and the first gradient data is a first vertical derivative of the first potential field data.

Step S2: perform upward continuation of the first potential field data and the first gradient data by using a wave-number domain conversion method, to obtain second gradient data $u_z(x, y, z_0+h)$ after upward continuation by a height of h, third gradient data $u_z(x, y, z_0+2h)$ after upward continuation by a height of 2h, and second potential field data $u_z(x, y, z_0+3h)$ after upward continuation by a height of 3h, where h represents a distance between the observation surface and a continuation surface, h>0.

Specifically, a wave-number domain refers to a space in which a result obtained by Fourier transform of spatial domain data is located, and a data conversion relational expression for different heights is:

$$u(x, y, z_0 + h) = \frac{1}{2\pi} \int_{-\infty}^{\infty} \int_{-\infty}^{\infty} \frac{u(x, y, z_0)h}{[(x-\xi)^2 + (y-\eta)^2 + h^2]^{3/2}} d\xi d\eta \quad (1)$$

where x,y,ξ,η represents a coordinate variable, and ξ,η is another representation of coordinates x,y.

An upward continuation method of a wave-number domain is obtained by Fourier transform of the formula (1):

$$u(x, y, z_0 + h) = F^{-1}\left[U(k_x, k_x, z_0)e^{-h\sqrt{k_x^2+k_y^2}}\right] \quad (2)$$

where $F^{-1}$ represents inverse Fourier transform, $k_x, k_y$ represents wave-number domain coordinates corresponding to spatial domain coordinates x,y, $U(k_x, k_x, z_0)$ is a wave-number domain expression of $u(x, y, z_0)$, and $$e^{-h\sqrt{k_x^2+k_y^2}}$$

represents an upward continuation operator of the wavenumber domain.

The above is the process of obtaining the second potential field data, and to acquire the second potential field data and the third potential field data, $u(x, y, z_0)$ and h need to be replaced with corresponding $u_z(x, y, z_0)$ and h and $u_z(x, y, z_0)$ and 2h.

Step S3: determine third potential field data after downward continuation by a height of h by using a fourth-order explicit scheme Milne method according to the first gradient data, the second gradient data, the third gradient data, and the second potential field data.

The step S3 specifically includes:

determining the third potential field data according to a formula $$\tilde{u}(x, y, z_0 - h) = u(x, y, z_0 + 3h) + \frac{4h}{3}[2u_z(x, y, z_0 + 2h) - u_z(x, y, z_0 + h) + 2u_z(x, y, z_0)];$$

where $u(x, y, z_0+3h)$ represents second potential field data, $u_z(x, y, z_0+h)$ represents second gradient data, $u_z(x, y, z_0+2h)$ represents third gradient data, $u_z(x, y, z_0)$ represents first gradient data, and $z_0$ represents a height of an observation surface.

Step S4: calculate fourth gradient data after downward continuation by a height of h by using an ISVD method according to the third potential field data.

The ISVD method also becomes an integrated second vertical derivative method: ISVD (integrated second vertical derivative) refers to a method for calculating a vertical derivation of each order of the potential field.

The step S4 specifically includes:
determining a scalar potential $\tilde{v}(x, y, z_0-h)$ of the third potential field data by using a wave-number domain conversion method according to the third potential field data $\tilde{u}(x, y, z_0-h)$ $$\tilde{v}(x, y, z_0 - h) = F^{-1}\left[F[\tilde{u}(x, y, z_0 - h)]\frac{1}{2\pi\sqrt{k_x^2 + k_y^2}}\right]$$

where F represents Fourier transform and $$\frac{1}{2\pi\sqrt{k_x^2 + k_y^2}}$$

represents a vertical integral operator of a wave-number domain.

A second derivative of the scalar potential in the horizontal direction is determined by using a finite difference method according to the scalar potential, $$\begin{cases}\tilde{v}_{xx}(x, y, z_0 - h) = \left[\begin{array}{c}\tilde{v}(x+\Delta x, y, z_0 - h) + \tilde{v}(x-\Delta x, y, z_0 - h) - \\ 2\tilde{v}(x, y, z_0 - h)\end{array}\right]\Big/\Delta x^2 \\ \tilde{v}_{yy}(x, y, z_0 - h) = \left[\begin{array}{c}\tilde{v}(x+\Delta y, y, z_0 - h) + \tilde{v}(x-\Delta y, y, z_0 - h) - \\ 2\tilde{v}(x, y, z_0 - h)\end{array}\right]\Big/\Delta y^2\end{cases}$$

where $\Delta x, \Delta y$ represents a sampling interval in the horizontal direction.

Fourth gradient data is determined by using a Laplace method according to the second derivative of the scalar potential in the horizontal direction.

Specifically, by using the Laplace method (also known as the Laplace equation), a second derivative $\tilde{v}_{zz}(x, y, z_0-h)$ of the scalar potential $\tilde{v}(x, y, z_0-h)$ in the vertical direction is obtained, which is a first derivative $\tilde{u}_z(x, y, z_0-h)$ of the third potential field data $\tilde{u}(x, y, z_0-h)$ in the vertical direction, namely the fourth gradient data, $$\tilde{u}_z(x, y, z_0 - h) = \tilde{v}_{zz}(x, y, z_0 - h)$$
$$= -[\tilde{v}_{xx}(x, y, z_0 - h) + \tilde{v}_{yy}(x, y, z_0 - h)].$$

Step S5: correct the third potential field data by using a fourth-order explicit scheme Milne method according to the fourth gradient data, the first potential field data, the first gradient data, and the second gradient data, to obtain corrected third potential field data.

The step S5 specifically includes:
determining the corrected third potential field data according to a formula $$u(x, y, z_0 - h) =$$
$$u(x, y, z_0) + \frac{h}{3}[u_z(x, y, z_0 + h) + 4u_z(x, y, z_0) + \tilde{u}_z(x, y, z_0 - h)],$$

where $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

Figure 2:
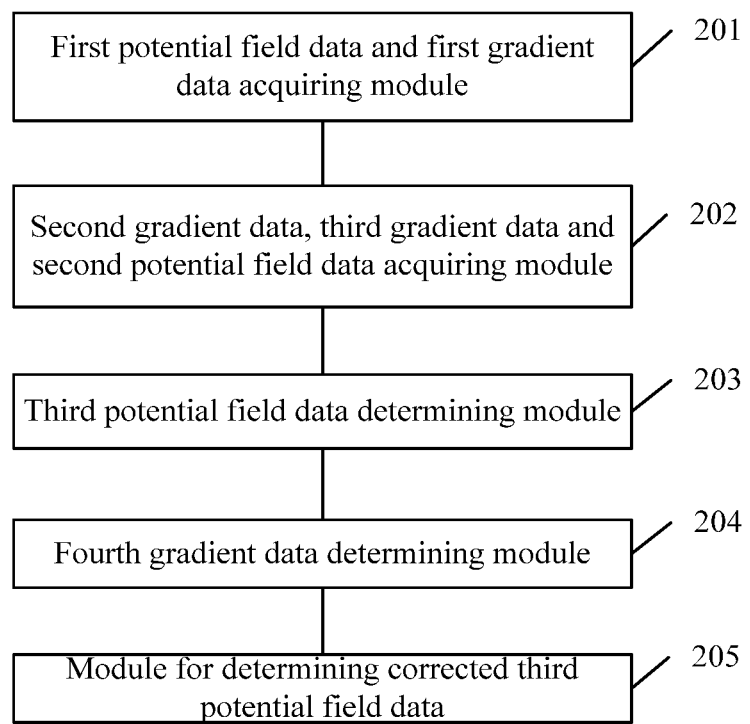
FIG. 2 is a schematic structural view of a system for processing gravity and magnetic data in geological resource exploration according to an embodiment of the present invention.

FIG. 2 is a schematic structural view of a system for processing gravity and magnetic data in geological resource exploration according to an embodiment of the present invention. Referring to FIG. 2, the system for processing gravity and magnetic data in geological resource exploration includes:

a first potential field data and first gradient data acquiring module 201, configured to acquire first potential field data and first gradient data of an observation surface, where the observation surface is a horizontal plane of a survey location, the first potential field data is gravity field data or magnetic field data at a height of the observation surface, and the first gradient data is a first vertical derivative of the first potential field data;

a second gradient data, third gradient data and second potential field data acquiring module 202, configured to perform upward continuation of the first potential field data and the first gradient data by using a wave-number domain conversion method, to obtain second gradient data after upward continuation by a height of h, third gradient data after upward continuation by a height of 2h, and second potential field data after upward continuation by a height of 3h, where h represents a distance between the observation surface and a continuation surface, h>0;

a third potential field data determining module 203, configured to determine third potential field data after downward continuation by a height of h by using a fourth-order explicit scheme Milne method according to the first gradient data, the second gradient data, the third gradient data, and the second potential field data;

the third potential field data determining module 203 specifically including:

a third potential field data determining unit, configured to determine the third potential field data according to a formula $$\tilde{u}(x, y, z_0 - h) =$$
$$u(x, y, z_0 + 3h) + \frac{4h}{3}[2u_z(x, y, z_0 + 2h) - u_z(x, y, z_0 + h) + 2u_z(x, y, z_0)];$$

where $u(x, y, z_0+3h)$ represents second potential field data, $u_z(x, y, z_0+h)$ represents second gradient data, $u_z(x, y, z_0+2h)$ represents third gradient data, $u_z(x, y, z_0)$ represents first gradient data, and $z_0$ represents a height of an observation surface;

a fourth potential field data determining module 204, configured to calculate fourth gradient data after downward continuation by a height of h by using an ISVD method according to the third potential field data;

the fourth potential field data determining module 204 specifically including:

a scalar potential determining unit, configured to determine a scalar potential of the third potential field data by using a wave-number domain conversion method according to the third potential field data;

a unit for determining a second derivative of a scalar potential in the horizontal direction, configured to determine a second derivative of the scalar potential in the horizontal direction by using a finite difference method according to the scalar potential; and a fourth gradient data determining unit, configured to determine the fourth gradient data by using a Laplace method according to the second derivative of the scalar potential in the horizontal direction; and a module 205 for determining corrected third potential field data, configured to correct the third potential field data by using a fourth-order explicit scheme Milne method according to the fourth gradient data, the first potential field data, the first gradient data, and the second gradient data, to obtain corrected third potential field data;

the module 205 for determining corrected third potential field data specifically including:

a unit for determining corrected third potential field data, configured to determine the corrected third potential field data according to a formula $$u(x, y, z_0 - h) = u(x, y, z_0) + \frac{h}{3}[u_z(x, y, z_0 + h) + 4u_z(x, y, z_0) + \tilde{u}_z(x, y, z_0 - h)],$$

where $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

Potential field data in the present invention also refers to gravity and magnetic data. Due to the limitation of observation conditions and means, potential field data below an observation surface cannot be obtained, but potential field data below the observation surface can be calculated by downward continuation of the potential field data. Through the above method of the embodiment of the present invention, more accurate potential field downward continuation data is obtained, the resolution of potential field data processing and interpretation is improved, and a full space potential field database is provided for gravity or magnetic assisted navigation.

The potential field data processing and interpretation further includes separation of the potential field, boundary detection of the potential field, and the like. The high-resolution field data having been subjected to downward continuation can better locate the underground rock mass and structure, and is a gravity and magnetic method and technology serving the exploration and prospecting industry.

Gravity or magnetic assisted navigation is a matching navigation method that uses gravity field (or magnetic field) features of the Earth to obtain position information of a carrier. The acquisition of a high-precision potential field data (gravity and magnetic potential field data) library is a key technology that must be completed. The downward continuation of the potential field is the main means of obtaining a potential field database.

For a system disclosed in the embodiments, since it corresponds to the method disclosed in the embodiments, the description is relatively simple, and reference can be made to the method description.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A method for processing gravity and magnetic data in geological resource exploration, comprising:

acquiring first potential field data and first gradient data of an observation surface, wherein the observation surface is a horizontal plane of a survey location, the first potential field data is gravity field data or magnetic field data at a height of the observation surface, and the first gradient data is a first vertical derivative of the first potential field data;

performing upward continuation of the first potential field data and the first gradient data by using a wave-number domain conversion method, to obtain second gradient data after upward continuation by a height of h, third gradient data after upward continuation by a height of 2h and second potential field data after upward continuation by a height of 3h, wherein h represents a distance between the observation surface and a continuation surface, h>0;

determining third potential field data after downward continuation by a height of h by using a fourth-order explicit scheme Milne method according to the first gradient data, the second gradient data, the third gradient data, and the second potential field data;

calculating fourth gradient data after downward continuation by a height of h by using an ISVD (integrated second vertical derivative) method according to the third potential field data;

correcting the third potential field data by using a fourth-order explicit scheme Milne method according to the fourth gradient data, the first potential field data, the first gradient data, and the second gradient data, to obtain corrected third potential field data; and locating an underground rock mass and structure based on the corrected third potential field data.

2. The method for processing gravity and magnetic data in geological resource exploration according to claim 1, wherein the determining third potential field data after downward continuation by a height of h by using a fourth-order explicit scheme Milne method according to the first gradient data, the second gradient data, the third gradient data, and the second potential field data specifically comprises:

determining the third potential field data according to a formula $$\tilde{u}(x, y, z_0 - h) = u(x, y, z_0 + 3h) + \frac{4h}{3}[2u_z(x, y, z_0 + 2h) - u_z(x, y, z_0 + h) + 2u_z(x, y, z_0)];$$

wherein $u(x, y, z_0+3h)$ represents second potential field data, $u(x, y, z_0+h)$ represents second gradient data, (x, y $z_0+2h$) represents third gradient data, $u_z(x, y, z_0)$ represents first gradient data, $z_0$ represents a height of an observation surface, and x, y represents spatial domain coordinates.

3. The method for processing gravity and magnetic data in geological resource exploration according to claim 1, wherein the calculating fourth gradient data after downward continuation by a height of h by using an ISVD method according to the third potential field data specifically comprises:

determining a scalar potential of the third potential field data by using a wave-number domain conversion method according to the third potential field data;

determining a second derivative of the scalar potential in the horizontal direction by using a finite difference method according to the scalar potential; and determining the fourth gradient data by using a Laplace method according to the second derivative of the scalar potential in the horizontal direction.

4. The method for processing gravity and magnetic data in geological resource exploration according to claim 1, wherein the correcting the third potential field data by using a fourth-order explicit scheme Milne method according to the fourth gradient data, the first potential field data, the first gradient data, and the second gradient data, to obtain corrected third potential field data specifically comprises:

determining the corrected third potential field data according to a formula $$u(x, y, z_0 - h) = u(x, y, z_0) + \frac{h}{3}[u_z(x, y, z_0 + h) + 4u_z(x, y, z_0) + \tilde{u}_z(x, y, z_0 - h)];$$

wherein $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

5. A system for processing gravity and magnetic data in geological resource exploration, the system comprising a processor configured to:

acquire first potential field data and first gradient data of an observation surface, wherein the observation surface is a horizontal plane of a survey location, the first potential field data is gravity field data or magnetic field data at a height of the observation surface, and the first gradient data is a first vertical derivative of the first potential field data;

perform upward continuation of the first potential field data and the first gradient data by using a wave-number domain conversion method, to obtain second gradient data after upward continuation by a height of h, third gradient data after upward continuation by a height of 2h, and second potential field data after upward continuation by a height of 3h, wherein h represents a distance between the observation surface and a continuation surface, h>0;

determine third potential field data after downward continuation by a height of h by using a fourth-order explicit scheme Milne method according to the first gradient data, the second gradient data, the third gradient data, and the second potential field data;

calculate fourth gradient data after downward continuation by a height of h by using an ISVD (integrated second vertical derivative) method according to the third potential field data;

correct the third potential field data by using a fourth-order explicit scheme Milne method according to the fourth gradient data, the first potential field data, the first gradient data, and the second gradient data, to obtain corrected third potential field data; and locate an underground rock mass and structure based on the corrected third potential field data.

6. The system for processing gravity and magnetic data in geological resource exploration according to claim 5, wherein the processor is further configured to determine the third potential field data according to a formula $$\tilde{u}(x, y, z_0 - h) = u(x, y, z_0 + 3h) + \frac{4h}{3}[2u_z(x, y, z_0 + 2h) - u_z(x, y, z_0 + h) + 2u_z(x, y, z_0)];$$

wherein $u(x, y, z_0+3h)$ represents second potential field data, $u_z(x, y, z_0+h)$ represents second gradient data, $u_z(x, y, z_0+2h)$ represents third gradient data, $u_z(x, y, z_0)$ represents first gradient data, $z_0$ represents a height of an observation surface, and x, y represents spatial domain coordinates.

7. The system for processing gravity and magnetic data in geological resource exploration according to claim 5, wherein the processor is further configured to:

determine a scalar potential of the third potential field data by using a wave-number domain conversion method according to the third potential field data;

determine a second derivative of the scalar potential in the horizontal direction by using a finite difference method according to the scalar potential; and determine the fourth gradient data by using a Laplace method according to the second derivative of the scalar potential in the horizontal direction.

8. The system for processing gravity and magnetic data in geological resource exploration according to claim 5, wherein the processor is further configured to determine the corrected third potential field data according to a formula $$u(x, y, z_0 - h) = u(x, y, z_0) + \frac{h}{3}[u_z(x, y, z_0 + h) + 4u_z(x, y, z_0) + \tilde{u}_z(x, y, z_0 - h)],$$

wherein $u(x, y, z_0)$ represents first potential field data, $u_z(x, y, z_0)$ represents first gradient data, $u_z(x, y, z_0+h)$ represents second gradient data, and $\tilde{u}_z(x, y, z_0-h)$ represents fourth gradient data.

* * * * *